3,287,991
ROTARY CONTROL MECHANISM
Herbert L. Eckert, Cedar Rapids, Iowa, assignor to Allis-Chalmers Manufacturing Company, Milwaukee, Wis.
Filed Mar. 23, 1964, Ser. No. 353,961
2 Claims. (Cl. 74—533)

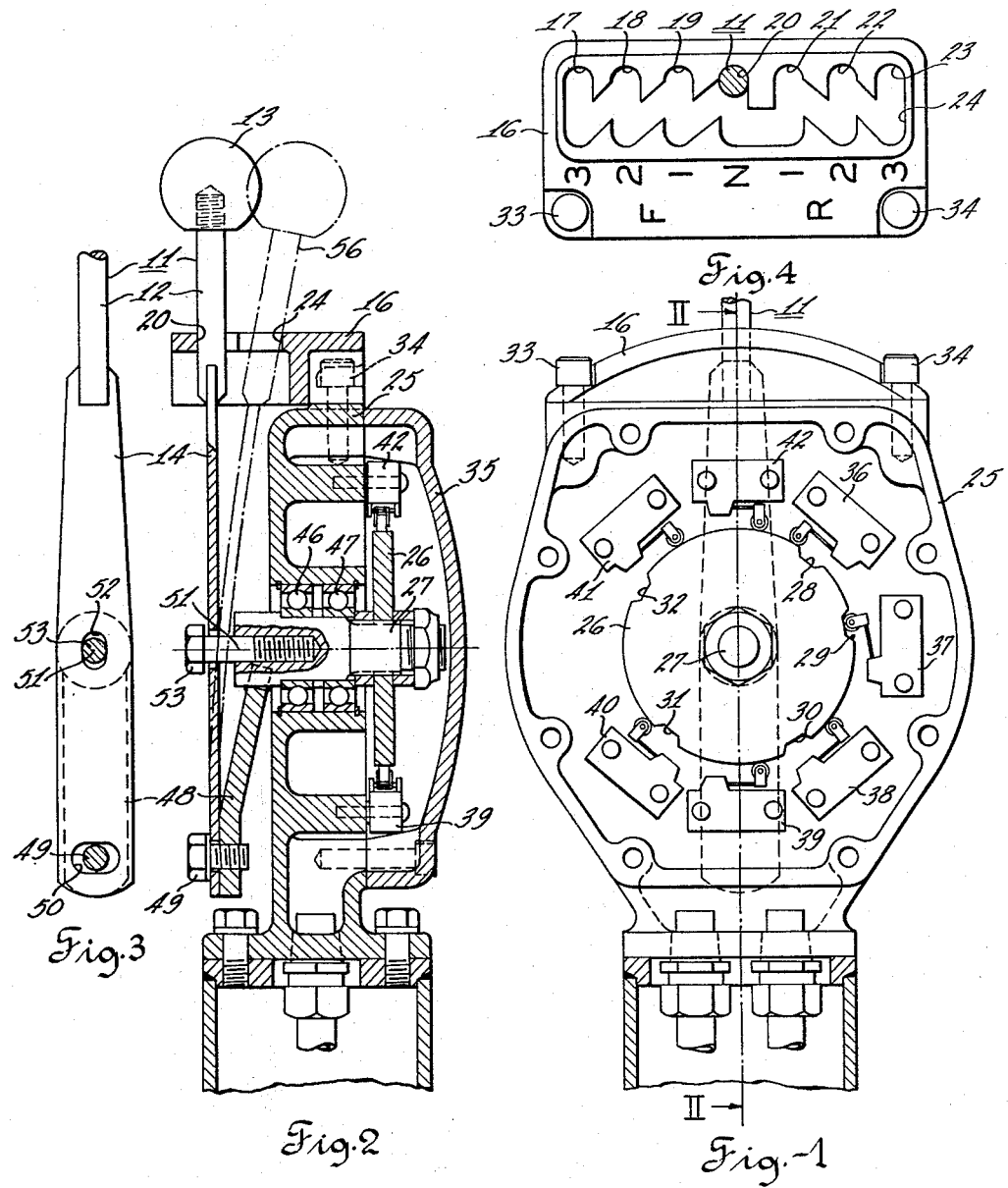

This invention relates to a manually operated rotary control mechanism and particularly to the mounting arrangement for the manual control lever thereof.

It is an object of the present invention to provide an improved rotary control mechanism employing a flexible control lever.

It is a further object of this invention to provide a rotary control mechanism having a flexible lever indexed in notches and secured to a rotated member having control positions of rotated adjustment and means for adjusting the lever relative to the rotated member to accurately coordinate the notch engaging positions of the lever with the control positions of rotated member.

It is a further object of this invention to provide an adjustably mounted lever on a rotary control mechanism which occupies minimum space and is flexible in the direction of the axis of rotation of the control mechanism thereby permitting the lever to bias itself toward detented positions.

These and other objects and advantages of this invention will be apparent upon reading the following description in conjunction with the drawings in which:

FIG. 1 is an end view of a rotary control incorporating this invention;

FIG. 2 is a section view taken along the line II—II in FIG. 1;

FIG. 3 is an end view of the flexible lever of this invention; and

FIG. 4 is a top view showing the shift plate.

The drawings illustrate my invention incorporated in an electric control for a change speed transmission. As shown in the drawings, a flexible manual control lever 11 has an upper part 12 with a threaded end screwed into a drilled and tapped hole in knob 13 and a lower flexible metal leaf spring portion 14 rigidly secured to the rod portion 12. The upper portion 12 of the flexible lever 11 extends upwardly through a guide in the form of a shift plate 16 and the spring action of the lever resiliently biases the lever to the left as shown in FIG. 2 toward whichever of the pockets or notches 17, 18, 19, 20, 21, 22, 23 it is aligned with. The notch 20 is the neutral position, notches 17, 18, 19 are the forward positions and notches 21, 22, 23 are the reverse positions of the transmission control lever 11. The zigzag opening 24, of which the notches are a part, is cast or otherwise formed in shift plate 16 to provide a shift pattern which guards against accidental shifting of the transmission such as when the operator might unintentionally bump against the control lever 11. The shape of the shift slot or opening 24 provides greatest protection against accidental shifting between forward and reverse and against down shifting in both forward and reverse speed ranges. The shift plate 16 is secured to the control housing 25 by a pair of cap screws 33, 34.

Referring to FIGS. 1 and 2, a cam 26 is splined to a pivot shaft 27 and has a plurality of recesses 28, 29, 30, 31, 32 engageable by the movable switch control elements of microswitches 36, 37, 38, 39, 40, 41, 42 mounted in the housing 25. In FIG. 1 the housing cover 35 has been removed for illustration purposes.

Referring to FIG. 2, the pivot shaft 27 is rotatably supported in the housing 25 by a pair of ball bearings 46, 47. Referring also to FIG. 3, the bottom end of the spring portion 14 of the lever 11 is secured to a downwardly extending arm 48, which is a part of shaft 27, by a cap screw 49. The cap screw extends through a slot 50 extending circumferentially relative to the axis 51 of shaft 27. A radially extending slot 52 is formed in the flexible portion 14 of lever 11 and the lever 11 is attached to the shaft 27 by a cap screw 53 extending through the radial slot 52 and threaded into a drilled and tapped hole coaxial with the shaft 27. The lever is free to shift axially on the cap screw 53, but is in radial thrust transmitting relation to the parallel confronting sides of the slot in closest proximity to one another. This connection forces the lever 11 to pivot about the axis 51 of shaft 27.

The horizontal slot 50 allows selective angular adjustment of the lever 11 relative to the shaft 27. This angular adjustability permits precise indexing or coordinating of the resiliently detented positions of the lever 11 with the switching positions of the cam 26. By fixedly securing the flexible lever to a downwardly extending arm 48 of the shaft 27, a flexible lever 11 of substantial length may be conveniently used. Although the leaf spring portion 14 has a cross section area sufficiently great to provide a strong lever, the lever is not excessively difficult to move axially out of engagement with a notch (to the position shown in dash lines 56 in FIG. 2, for instance), since it bends over substantially the entire length of the spring portion 14. The lengthwise slot 52 insures free movement of the lever axially relative to the shaft.

From the foregoing description it is apparent that I have provided an extremely novel rotary control mechanism which is compact, of rugged construction and relatively low in cost. By attaching the bottom portion of the lever to the shaft at a point spaced radially from the axis of the shaft in the opposite direction from the guide 16 and providing an axially free connection at the shaft center, the major portion of the length of the lever is free to resiliently deflect axially relative to the axis of the shaft. The releasable fastening member in the form of cap screw 49 and horizontal slot 50 provide an adjustable connection selectively permitting rotary adjustment of the lever 11 relative to the shaft 27, thus affording accurate coordination between the notch engaging positions of the lever and the control positions of control element or cam 26.

The embodiments of the invention in which an exclusive property or privilege is claimed are defined as follows:

1. A rotary control device comprising:
    a support,
    a shaft rotatably mounted on said support,
    a guide rigidly secured to said support in spaced relation to said shaft and presenting a plurality of pockets facing in an axial direction relative to said shaft,
    an elongated axially flexible control lever engageable with said pockets,
    first attaching means rigidly securing a portion of said lever to a part of said shaft spaced radially a substantial distance from its axis in the direction opposite from said guide, and
    second attaching means connecting an intermediate portion of said lever to said shaft for axial movement relative thereto, said lever being resiliently flexible axially relative to said shaft thereby permitting manual movement of said lever from one of said pockets to another.

2. The structure set forth in claim 1 wherein said first attaching means includes a releasable fastening member selectively permitting rotary adjustment of said lever relative to said shaft.

(References on following page)

References Cited by the Examiner

UNITED STATES PATENTS

| | | | |
|---|---|---|---|
| 902,944 | 11/1908 | Davis | 74—535 X |
| 1,304,783 | 5/1919 | Lederer | 74—533 |
| 1,806,783 | 5/1931 | Brand | 74—535 |
| 1,927,209 | 9/1933 | Gilmore | 74—529 X |
| 2,313,269 | 2/1943 | Ryan et al. | |
| 2,478,356 | 8/1949 | Auten | 74—490 X |
| 2,643,864 | 6/1953 | Graham et al. | 74—534 X |
| 3,011,039 | 11/1961 | Siri. | |

FOREIGN PATENTS

| | | |
|---|---|---|
| 81,190 | 11/1951 | Czechoslovakia. |
| 208,370 | 12/1923 | Great Britain. |

FRED C. MATTERN, JR., *Primary Examiner.*

MILTON KAUFMAN, *Examiner.*

C. F. GREEN, *Assistant Examiner.*